3,135,781
BORON-CONTAINING DIELS-ALDER ADDUCT COMPOUNDS
Kiyoshi Kitasaki, Garden Grove, George W. Willcockson, Anaheim, Irving S. Bengelsdorf, Santa Ana, and William G. Woods, Anaheim, Calif., assignors to United States Borax & Chemical Corporation, Los Angeles, Calif., a corporation of Nevada
No Drawing. Filed Dec. 4, 1961, Ser. No. 156,999
13 Claims. (Cl. 260—462)

The present invention is a continuation-in-part of our application, Serial No. 85,197, filed January 27, 1961, now abandoned.

This invention relates to a new class of unsaturated organoboron compounds obtained by causing organoboranes to act as dienophiles in the Diels-Alder reaction.

It is an object of the present invention to provide new boron-containing Diels-Alder adducts.

It is a further object of this invention to provide a method for making these new organoboron adducts.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these certain illustrative embodiments of the invention, these being indicative, however, of but a few of the various ways in which the principle of the invention may be employed.

Broadly stated, the present invention comprises the boron-containing Diels-Alder adduct having the formula

RBX where R is selected from the group consisting of unsaturated alicyclic groups, unsaturated alicyclic-acyclic groups, unsaturated bicyclic groups, unsaturated alicyclic-aromatic groups and unsaturated heterocyclic groups, and X is selected from the group consisting of $(OR)_2$ where R is an alkyl radical of from 1 to 4 carbon atoms and alkylenedioxy radicals of from 2 to 3 carbon atoms in length and containing a total of from 2 to 20 carbon atoms.

Thus, from the above broadly stated paragraph it will be seen that the present compositions comprise Diels-Alder adducts, and being Diels-Alder adducts the boron atom is always directly bonded to an unsaturated cyclic radical wherein a double bond of such radical is always in the gamma position in relation to the boron atom.

The Diels-Alder diene synthesis consists of 1,4-addition to a diene or a dienic compound of a second compound containing a double or triple bond. We have discovered that unsaturated organoboranes selected from the group of dialkoxyvinylboranes, dialkoxyethynylboranes, alkylenedioxyvinylboranes and alkylenedioxyethynylboranes when caused to react with a diene or dienic compound results in a new class of boron-containing adducts.

The unsaturated compounds useful in a Diels-Alder reaction are well known and are commonly referred to as dienes and dienic compounds and are of a wide variety of types. These compounds comprise the conjugated dienes, trienes, etc., compounds which have at least one pair of doubly bonded carbon atoms adjacent to each other, e.g., C=C—C=C, and the dienic compounds in which one or both of the double bonds of the diene system is part of an aromatic ring. Examples of compounds in which the diene system is part of an aromatic ring are the anthracenes, vinylnaphthalenes, and phenanthrenes; thus the conjugated diene system can be part of an aromatic system. Still further, diene systems can be substituted by a multiplicity of groups without hindering the Diels-Alder reaction.

Thus, for the sake of brevity and ease of handling, in the present specification and claims the compounds referred to as Diels-Alder dienes are those materials which contain a 1,3-dienic system.

The Diels-Alder dienes can be classified as follows:

A. Acyclic dienes—for example compounds as butadiene, alkylbutadienes, arylbutadienes.
Alicyclic compounds—
   (1) Wholly alicyclic dienes such as cyclopentadiene, cyclohexadiene, α-phellandrene, cycloheptadiene.
   (2) Alicyclic-acyclic compounds such as 1-vinylcyclohexene, 1-vinyl-3,4-dihydronaphthalenes, 1-ethynyl-6-methoxy-3,4-dihydronaphthalene.
   (3) Bicyclic compounds such as bicyclohexenyl.
C. Aromatic compounds—
   (1) Wholly aromatic compounds such as anthracene, 9-bromoanthracene.
   (2) Aromatic-acyclic compounds such as 1-vinylnaphthalene, methyleneanthrone.
D. Heterocyclic compounds such as furan, 2-methylfuran, 1,3-diphenyl-5,6-dimethylisobenzofuran.

While the dienophilic reactant of the present invention is limited to the previously defined vinylboranes and ethynylboranes, the second reactant can be any Diels-Alder diene. The following list is representative of the possible dienes which are applicable to the present invention:

Butadiene
Piperylene
2-methyl-1,3-butadiene
1,3-hexadiene
2,4-hexadiene
2-methyl-1,3-pentadiene
3-methyl-1,3-pentadiene
4-methyl-1,3-pentadiene
2,3-dimethyl-1,3-butadiene
2,4-heptadiene
5-methyl-1,3-hexadiene
5-methyl-2,4-hexadiene
2,4-dimethyl-1,3-pentadiene
4-ethyl-1,3-hexadiene
2-cyclopropyl-1,3-butadiene
2,6-dimethyl-3,5-octadiene
7-methyl-3-methylene-1,6-octadiene
5-methyl-4-isopropyl-1,3-hexadiene
1-phenyl-1,3-butadiene
4-phenyl-1,3-pentadiene
2-methyl-1-phenyl-1,3-butadiene
6-phenyl-1,3-hexadiene
4-p-tolyl-1,3-pentadiene
4-(2′,4′-dimethylphenyl)-1,3-pentadiene
Hexachlorocyclopentadiene
1-butadienyl-2-vinyl-3-cyclohexene
3-tert-butyl-1-phenyl-1,3-butadiene
1,4-diphenyl-1,3-butadiene
2,3-diphenyl-1,3-butadiene
1-p-nitrophenyl-4-phenyl-1,3-butadiene
1-o-chlorophenyl-4-phenyl-1,3-butadiene
1-m-chlorophenyl-4-phenyl-1,3-butadiene
1-p-chlorophenyl-4-phenyl-1,3-butadiene
1-p-bromophenyl-4-phenyl-1,3-butadiene
1,2-diphenyl-1,3-pentadiene
1,2,4-triphenyl-1,3-pentadiene
1-p-biphenyl-4-phenyl-1,3-butadiene
2-chloro-1,3-butadiene
1-chloro-3-methyl-1,3-pentadiene
2-bromo-1,3-butadiene
1-bromo-3-methyl-1,3-butadiene
5,6-dibromo-1,3-hexadiene
1,6-dibromo-2,4-hexadiene
2,3-dimethoxy-1,3-butadiene 3-chloro-5-methoxy-1,3-pentadiene
2-(3-methyl-1,3-butadienyl)methyl thioether
2-(3-methyl-1,3-butadienyl)ethyl thioether
2-(3-methyl-1,3-butadienyl)isopropyl thioether
2-formoxy-1,3-butadiene
2-acetoxy-1,3-butadiene
1,3,5-hexatriene
2,5-dimethyl-1,3,5-hexatriene
2,6-dimethyl-2,4,6-octatriene
Allo-ocimene
4-phenyl-1,3,6-heptatriene
4-o-tolyl-1,3,6-heptatriene
1-(2',6',6'-trimethylcyclohexenyl)-3-methyl-1,3-butadiene
2-methylenedicyclohexylideneethane
1,6-diphenyl-1,3,5-hexatriene
α-(1Δ'-octahydronaphthyl)-β-2'-methylenecyclohexylideneethane
1,8-diphenyl-1,3,5,7-octatetraene
1,10-diphenyl-1,3,5,7,9-decapentaene
Ethyl-9,11-octadecadienoate
1,3-hexadien-5-yne
2,5-dimethyl-1,5-hexadien-3-yne
2-ethyl-2-hexenalaniline
Cyclopentadiene
1,5,5-trimethyl-1,3-cyclopentadiene
1-benzyl-1,3-cyclopentadiene
2-benzyl-1,3-cyclopentadiene
1,4-diphenyl-1,3-cyclopentadiene
1-phenyl-4-p-tolyl-1,3-cyclopentadiene
6,6-dimethylfulvene
6,6-pentamethylenefulvene
6-styrylfulvene
6,6-diphenylfulvene
1-carbomethoxy-1,3-cyclopentadiene
1-carbomethoxy-4,5,5-trimethyl-1,3-cyclopentadiene
2-carbomethoxy-1,5,5-trimethyl-1,3-cyclopentadiene
2,5-dimethyl-3,4-diphenyl-1,3-cyclopentadienone
Tetraphenylcyclopentadienone
2,5-diphenyl-3,4-(O,O'-biphenylene)-1,3-cyclopentadienone
2,5-diphenyl-3,4-(1',8'-naphthylene)-1,3-cyclopentadienone
3a,7a-dihydro-3,3a,5,6-tetraphenylinden-1-one
1,3-cyclohexadiene
1,3,5,5-tetramethyl-1,3-cyclohexadiene
1,2,6,6-tetramethyl-1,3-cyclohexadiene
1-5-isopropyl-1,3-cyclohexadiene
d-α-Phellandrene
l-α-Phellandrene
l-β-Phellandrene
1,3-menthadiene
Thebaine
Methyl abietate
2,4-cholestadiene
7,14-cholestadiene
Δ$^{6,8}$-coprostadienol acetate
5-methyl-Δ$^{8(14),9(11)}$-norcholestadien-3,6-diol diacetate
22,23-dihydroergosterol acetate
Dehydroergosterol acetate
1,3-cycloheptadiene
Cycloheptatriene
1,1'-bicyclopentenyl
1,1'-bicyclohexenyl
3,4,3',4'-tetrahydro-1,1'-binaphthyl
3,4,3'4'-tetrahydro-2,2'-binaphthyl
3,4,3',4'-tetrahydro-7,7'-dimethyl-1,1'-binaphthyl
3,3'-biindenyl
1-vinyl-1-cyclohexene
2-methyl-1-vinyl-1-cyclohexene
1-vinyl-3,4-dihydronaphthalene
1-ethynyl-6-methoxy-3,4-dihydronaphthalene
2-acetoxy-10-methyl-8-vinyl-5,8,9,10-tetrahydro-1,4-naphthoquinone
1-cyclopentenylisopropenylacetylene
1-cyclohexenyl-1'-cyclopentenylacetylene
Di-1-cyclohexenylacetylene
2-methyl-di-1-cyclohexenylacetylene
Anthracene
9-methylanthracene
2-isopropenylanthracene
9-phenylanthracene
9-benzylanthracene
2-chloroanthracene
9-bromoanthracene
9-nitroanthracene
9-acetoxyanthracene
9-anthrylacetamide
Ethyl-9-anthrylcarbamate
9,9'-bianthryl
9,10-dimethylanthracene
9,10-diphenylanthracene
10,10'-diphenyl-9,9'-bianthryl
9,10-dichloromethylanthracene
9,10-dichloroanthracene
9,10-dibromoanthracene
9,10-dimethoxyanthracene
1,5-dichloro-9-acetoxyanthracene
1,8-dichloro-9-acetoxyanthracene
4,5-dichloro-9-acetoxyanthracene
1,2-benzanthracene
9,10-dimethyl-1,2-benzanthracene
9,10-diethyl-1,2-benzanthracene
Cholanthrene
5,9,10-trimethyl-1,2-benzanthracene
3-methyl cholanthrene
2,3-benzanthracene
1,4-diphenyl-2,3-benzanthracene
Benzanthrene
1,2,3,4-dibenzanthracene
1,2,5,6-dibenzanthracene
3,3'',7,3''-bis-trimethylene-1,2,5,6-dibenzanthracene
1,2,6,7-dibenzanthracene
2,3,6,6-dibenzanthracene
9,10-diphenyl-2,3,6,7-dibenzanthracene
1,4-dihydro-9,10-diphenyl-2,3,6,7-dibenzanthracene
9,10-dichloro-2,3,6,7-dibenzanthracene
1,2,6,7-dibenzphenanthrene
2,3,6,7-dibenzphenanthrene
Perylene
3,9-dichloroperylene
3,9-dibenzoperylene
1,2-diphenylaceperylene
Hexacene
5,16-dihydrohexacene
1,2,7,8-dibenztetracene
3,4,8,9-dibenztetraphene
1,2-(2',3'-naphtho)-pyrene
5,18-dihydroheptacene
6,17-dihydroheptacene
1,2,8,9-dibenzpentacene
2,3,10,11-dibenzperylene
1,9,5,10-di-perinaphthyleneanthracene
Methyleneanthrone
Benzylideneanthrone
β-Anthraquinonylmethyleneanthrone
Isosafrole
Isoeugenol methyl ether
Cis-Isoeugenol ethyl ether
2,3-dimethoxy-1-propenylbenzene
1-(3',4'-methylenedioxyphenyl)-1-pentene
Methyl-3,4-methylenedioxyphenyl-acetylene
Cis-diphenylethylene
Indene
1-vinylnaphthalene
2-vinylnaphthalene
1-propenylnaphthalene
1-vinyl-6-methoxynaphthalene
1-(α-naphthyl)-1-cyclopentene
1-(β-naphthyl)-1-cyclopentene
2-methyl-1-(α-naphthyl)-1-cyclopentene 2-methyl-1-(β-naphthyl)-1-cyclopentene
1-(6′-methoxy-2′-naphthyl)-1-cyclopentene
1-(6′-methoxy-2′-naphthyl)-2-methyl-1-cyclopentene
3 - (5′-bromo-6′-methoxy-2′-naphthyl)-2-methyl-2-cyclopenten-1-one
1-(β-naphthyl)-1-cyclohexene
9-vinylphenanthrene
9-propenylphenanthrene
9-isopropenylphenanthrene
9-cyclopentenylphenanthrene
9-styrylphenanthrene
Furan
2-methylfuran
2-ethylfuran
2-(β-phenylethyl)-furan
2-(β-m-methoxyphenylethyl)-furan
2-vinylfuran
Furfurylacetone
2-bromofuran
3-bromofuran
Furfuryl acetate
Furfuryl diacetate
Furfuryl methyl ether
2,5-dimethylfuran
2-methyl-5-isopropylfuran
2-sec-butyl-5-methylfuran
5-methylfurfurylacetone
5-methylfurfurylacetophenone
2,5-bis-(γ-ketobutyl)-furan
β-(5-methyl-2-furyl)-n-butyraldehyde
1,3-diphenylisobenzofuran
1,3-di-p-tolylisobenzofuran
1,3-di-p-chlorophenylisobenzofuran
1,3-diphenyl-4,7-dimethylisobenzofuran
1,3-diphenyl-5,6-dimethylisobenzofuran
1,3-di-p-tolyl-5,6-dimethylisobenzofuran
1,3-di-p-chlorophenyl-5,6-dimethylisobenzofuran
1,3-di-α-naphthylisobenzofuran
1-benzoyl-3-phenylisobenzofuran
1,3,5,6-tetraphenylisobenzothiophene
2,3,4,5-di-(1,8′-naphthylene)-thiophene
2,6-dimethyl-3-propenyl-5,6-dihydro-1,2-pyran
α-Pyrone
5-methyl-α-pyrone
5-ethyl-α-pyrone
4,6-dimethyl-α-pyrone
Methyl coumalate Referring more specifically to the dienophiles of the present reaction, the dialkoxyvinylboranes and dialkoxyethynylboranes can be illustrated by the general formulae $H_2C=CHB(OR')_2$ and $HC\equiv CB(OR')_2$, respectively, wherein R′ is an unsubstituted saturated alkyl group containing from 1 to 4 carbon atoms; the alkylenedioxyvinylboranes and alkylenedioxyethynylboranes can best be illustrated generally by the formulae

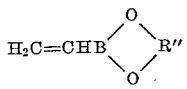

and

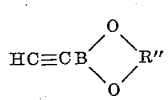

respectively, where in this instance R″ is an alkylene group of from 2 to 3 carbon atoms in length and containing from 2 to 20 carbon atoms. Thus it will be seen that R″ is derived from alkane diols where the hydroxy groups are separated by 2 or 3 carbon atoms. Such diols can be substituted with hydrocarbon groups, such as alkyl, cycloalkyl, aralkyl, aryl and alkaryl. The nature of such substituents is immaterial so long as the total number of carbon atoms in the alkane diol is not greater than about 20.

The following list is illustrative of the dienophilic compounds useful in the present invention:

Dimethoxyvinylborane
Dimethoxyethynylborane
Diethoxyvinylborane
Diethoxyethynylborane
Di-n-propoxyvinylborane
Di-n-propoxyethynylborane
Di-n-butoxyvinylborane
Di-n-butoxyethynylborane
2-methylpentane-2,4-dioxy(vinyl)borane
2-methylpentane-2,4-dioxy(ethynyl)borane The adducts of the present invention will be found to have particular utility as insecticides, bactericides and fungicides. They can be used alone or in admixture with other insecticides, bactericides or fungicides and can be applied either in concentrated form or diluted with a suitable solvent. The halogen substituted conjugated dienes when reacted with the foregoing dialkoxyvinylboranes result in adducts which are particularly effective insecticides and can be used in aerosols and space sprays.

So that the present invention can be more clearly understood, the following examples are given for illustrative purposes:

(I)

6.2 grams (0.062 mole) of dimethoxyvinylborane and 4.1 grams (0.062 mole) of cyclopentadiene were heated at 170° C. to 185° C. for 20 hours and then cooled to room temperature. The product, 2-dimethoxyborylbicyclo-[2.2.1]-heptene-5, was distilled from the reaction mixture at reduced pressure. Chemical analysis yielded the following data.

B in $C_9H_{15}O_2B$: Calculated=6.52%. B in product: Found=6.34%.

(II)

7.5 grams (0.048 mole) of di-n-propoxyvinylborane and 4.1 grams (0.05 mole) of 2,3-dimethylbutadiene were heated at 170° C. to 180° C. for about 20 hours and then cooled to room temperature. The product, 1-di-n-propoxyboryl-3,4-dimethylcyclohexene-3, was distilled from the reaction mixture at reduced pressure. Chemical analysis yielded the following data.

B in $C_{14}H_{27}O_2B$: Calculated=4.55%. B in product: Found=4.48%.

(III)

5.1 grams (0.04 mole) of diethoxyvinylborane and 10.9 grams (0.04 mole) of hexachlorocyclopentadiene were heated at 150° C. for about 16 hours and then were cooled to room temperature. The product, 1,4,5,6,7,7-hexachloro-2-(diethoxyboryl)bicyclo - [2.2.1]-heptene-5, was distilled from the reaction mixture at reduced pressure. Chemical analysis yielded the following data.

B in $C_{11}H_{13}Cl_6O_2B$: Calculated=2.70%. B in product: Found=2.59%.

(IV)

4.9 grams (0.05 mole) of dimethoxyethynylborane and 4.1 grams (0.05 mole) of 2,3-dimethylbutadiene were heated for about 16 hours at 150° C. and then cooled to room temperature. The product, 1-dimethoxyboryl-4,5-dimethylcyclohexadiene-1,4, was distilled from the reaction mixture at reduced pressure. Chemical analysis yielded the following data.

B in $C_{10}H_{17}OB$: Calculated=6.01%. B in product: Found=5.85%.

(V)

5.2 grams (0.053 mole) of diethoxyethynylborane and 7.6 grams of 50% chloroprene in xylene were heated for about 4 hours at 140° C. to 150° C. and then cooled to room temperature. The product, 1-diethoxyboryl-4-chlorocyclohexadiene-1,4, was distilled from the reaction mixture at reduced pressure. Chemical analysis yielded the following data.

B in $C_8H_{11}ClO_2B$: Calculated=5.81%. B in product: Found=5.69%.

(VI)

6.2 grams (0.04 mole) of 2-methylpentane-2,4-dioxy-(vinyl)borane and 2.2 grams (0.04 mole) of butadiene were heated at 150° C. to 160° C. for about 20 hours and then cooled to room temperature. The product, 1-(2-methylpentane - 2,4-dioxyboryl)-cyclohexene-3, was distilled from the reaction mixture at reduced pressure.

B in $C_{12}H_{21}O_2B$: Calculated=5.20%. B in product: Found=5.12%.

(VII)

7.6 grams (0.05 mole) of 2-methylpentane-2,4-dioxy-(ethynyl)borane and 2.7 grams (0.05 mole) of butadiene were heated at 170° C. for about 20 hours and then cooled to room temperature. The product, 1-(2-methylpentane-2,4-dioxyboryl)-cyclohexadiene-1,4, was distilled at reduced pressure.

B in $C_{12}H_{19}O_2B$: Calculated =5.25%. B in product: Found=5.30%.

The reactions involving vinyl and ethynyl boranes are preferably carried out in the presence of trace amounts of free radical inhibitors, such as 2,2'-diphenyl-1-picryl-hydrazyl in an inert atmosphere so as to overcome any tendencies of homopolymerization by the vinyl and ethynyl compounds. Any free radical inhibitor can be used and it will be noted that the present invention is independent of such inhibitor. As stated above, an inhibitor is used to prevent homopolymerization of the vinyl and ethynyl materials.

The foregoing seven examples are only illustrative of the innumerable dienes which can be reacted with the present borane dienophiles; and further examples are deemed unnecessary and superfluous, since, as stated previously, any Diels-Alder diene system will react with the present borane dienophiles to produce a boron-containing adduct.

The rate of reaction and yields of the present process are primarily dependent upon the reactivity of the diene used in the reaction. The yield of adducts from acyclic dienes appears to be dependent more upon the position of the substituents in the acyclic chain than upon the size of the groups. For example, alkyl, alkoxy and aryl groups on $C_2$ or $C_2$ and $C_3$ carbons generally increases the activity of the diene; whereas, substitutions on the terminal positions slow down the reactivity of the diene. The diene systems in five- and six-carbon rings are generally very reactive and the reactivity is not appreciably affected with increased substitution.

Reactions can be carried out at temperatures of from below 0° C. to 300° C. depending upon the reactivity of the diene and the borane dienophile.

Other modes of applying the principle of the invention may be employed, change being made as regards the details described, provided the features stated in any of the following claims or the equivalent of such be employed.

We, therefore, particularly point out and distinctly claim as our invention:

1. A boron-containing Diels-Alder adduct having the formula $RB(OR')_2$ in which the boron atom is bonded directly to a cyclic radical having a double bond gamma to the boron atom, where R is selected from the group consisting of unsaturated alicyclic-acyclic groups, unsaturated bicyclic groups, unsaturated alicyclic-aromatic groups and unsaturated heterocyclic groups, and R' is an alkyl radical of from 1 to 4 carbon atoms.

2. A boron-containing Diels-Alder adduct having the formula

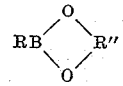

in which the boron atom is bonded directly to a cyclic radical having a double bond gamma to the boron atom, where R is selected from the group consisting of unsaturated alicyclic groups, unsaturated alicyclic-acyclic groups, unsaturated bicyclic groups, unsaturated alicyclic-aromatic groups and unsaturated heterocyclic groups, and R'' is an alkylene radical of from 2 to 3 carbon atoms in length and containing a total of from 2 to 20 carbon atoms.

3. 2-dimethoxyborylbicyclo-[2.2.1]-heptene-5.

4. 1,4,5,6,7,7 - hexachloro-2-(diethoxyboryl) - bicyclo-[2.2.1]-heptene-5.

5. 1-dimethoxyboryl-4,5-dimethylcyclohexadiene-1,4.

6. 1-diethoxyboryl-4-chlorocyclohexadiene-1,4.

7. 1-(2-methylpentane-2,4-dioxyboryl)cyclohexene-3.

8. 1 - (2-methylpentane - 2,4 - dioxyboryl)cyclohexadiene-1,4.

9. The method of producing a boron-containing Diels-Alder adduct which comprises heating a Diels-Alder diene with a material selected from the group consisting of dialkoxyvinylboranes, the alkoxy group having 1–4 carbon atoms, dialkoxyethynylboranes, the alkoxy group having from 1 to 4 carbon atoms, alkylenedioxyvinyboranes, the alkylene group being from 2 to 3 carbon atoms in length and containing a total of from 2 to 20 carbon atoms and alkylenedioxyethynylboranes, the alkylene group being from 2 to 3 carbon atoms in length and containing a total of from 2 to 20 carbon atoms.

10. The method of producing a boron-containing Diels-Alder adduct which comprises heating a Diels-Alder diene with a dialkoxyvinylborane, the alkoxy group of said borane having from 1 to 4 carbon atoms.

11. The method of producing a boron-containing Diels-Alder adduct which comprises heating a Diels-Alder diene with a dialkoxyethynylborane, the alkoxy group of said borane having from 1 to 4 carbon atoms.

12. The method of producing a boron-containing Diels-Alder adduct which comprises heating a Diels-Alder diene with an alkylenedioxyvinylborane, the alkylene group of said borane being 2 to 3 carbon atoms in length and containing a total of from 2 to 20 carbon atoms.

13. The method of producing a boron-containing Diels-Alder adduct which comprises heating a Diels-Alder diene with an alkylenedioxyethynylborane, the alkoxy group of said borane being from 2 to 3 carbon atoms in length and containing a total of from 2 to 20 carbon atoms.

References Cited in the file of this patent

UNITED STATES PATENTS 2,862,952   Groszos _____ Dec. 2, 1958